(12) United States Patent
Ledbetter et al.

(10) Patent No.: US 7,099,542 B2
(45) Date of Patent: Aug. 29, 2006

(54) LOW TEMPERATURE DRY LOOSE TUBE FIBER OPTIC CABLE

(75) Inventors: Jack Ledbetter, Carrollton, GA (US); Swati Neogi, Carrollton, GA (US); Antony Shacklady, Temple, GA (US)

(73) Assignee: Furukawa Electric North America, Norcross, GA (US)

( * ) Notice: Subject to any disclaimer, the term of this patent is extended or adjusted under 35 U.S.C. 154(b) by 132 days.

(21) Appl. No.: 11/012,913

(22) Filed: Dec. 15, 2004

(65) Prior Publication Data

US 2006/0127014 A1      Jun. 15, 2006

(51) Int. Cl.
*G02B 6/44*      (2006.01)
(52) U.S. Cl. ............... 385/109; 385/100; 385/110; 385/111; 385/112
(58) Field of Classification Search ........... 385/109, 385/100, 110, 111, 112
See application file for complete search history.

(56) References Cited

U.S. PATENT DOCUMENTS

| | | |
|---|---|---|
| 4,909,592 A | 3/1990 | Arroyo et al. |
| 5,630,003 A | 5/1997 | Arroyo |
| 6,088,499 A * | 7/2000 | Newton et al. ............. 385/112 |
| 2003/0026559 A1 * | 2/2003 | VanVickle et al. .......... 385/112 |

OTHER PUBLICATIONS

Fitel USA Corp., OFS Fortex(tm) DT Cable, product brochure two pages (2003).
FIBERLINE, Draft Product Specification for FL-P250LS/Swellcoat-3 yarn, one page (Dec. 5, 2003).

* cited by examiner

*Primary Examiner*—Brian Healy
*Assistant Examiner*—Mary El-Shammaa
(74) *Attorney, Agent, or Firm*—Law Office of Leo Zucker; Michael A. Morra (57) ABSTRACT

A water blocking configuration for a low temperature, dry loose tube fiber optic cable includes one or more flexible buffer tubes each having a passage sized to contain one or more optical fibers. A single yarn is disposed in the passage of each buffer tube, and the yarn has a denier of not more than 1500. The yarn is coated with particles of a water absorbent material having a size distribution of between zero and not more than 160 microns. A dry loose tube fiber optic cable having the disclosed configuration meets the Telcordia GR 20 (Issue 2) industry standard with respect to water penetration, change of fiber attenuation, and fiber tensile strength at a low temperature of −60 degrees C.

18 Claims, 7 Drawing Sheets

| Tube color | Layer | Thread Denier |
|---|---|---|
| BL | 1 | 1500 |
| OR | 1 | 1500 |
| GR | 1 | 250 |
| BR | 1 | 250 |
| BL | 2 | 1500 |
| OR | 2 | 1500 |
| GR | 2 | 250 |
| BR | 2 | 250 |

FIG.5

| | Amount of Penetration, cm | | |
|---|---|---|---|
| | Cable 1 | Cable 2 | Cable 3 |
| Outer layer | | | |
| BL Tube | 11.43 | 15.5 | 21.59 |
| OR Tube | 39.37 | 6 | 17.78 |
| GR Tube | 100 | 34 | 40.64 |
| BR Tube | 100 | 29 | 100 |
| Inner Layer | | | |
| BL Tube | 45.72 | 8 | 19.05 |
| OR Tube | 17.78 | 8.5 | 49.53 |
| GR Tube | 100 | 16 | 66.04 |
| BR Tube | 45.72 | 13 | 60.96 |

FIG.6

TEMPERATURE CYCLING DATA

| Tube | Thread | | -40°C | +70°C | -40°C | +70°C | -60°C |
|---|---|---|---|---|---|---|---|
| BL-inner | 1500 | Avg. dB | 0.015 | 0.017 | 0.019 | 0.020 | 0.016 |
| | | max dB | 0.050 | 0.040 | 0.050 | 0.060 | 0.050 |
| BL-outer | 1500 | Avg. ΔdB | 0.011 | 0.053 | 0.053 | 0.046 | 0.044 |
| | | max ΔdB | 0.020 | 0.110 | 0.120 | 0.070 | 0.070 |
| OR-Inner | 1500 | Avg. ΔdB | 0.014 | 0.034 | 0.035 | 0.029 | 0.024 |
| | | max ΔdB | 0.040 | 0.070 | 0.070 | 0.060 | 0.050 |
| OR-outer | 1500 | Avg. ΔdB | 0.013 | 0.051 | 0.043 | 0.046 | 0.048 |
| | | max ΔdB | 0.030 | 0.080 | 0.080 | 0.130 | 0.130 |
| GR-Inner | 250 | Avg. ΔdB | 0.005 | 0.026 | 0.028 | 0.024 | 0.028 |
| | | max ΔdB | 0.010 | 0.050 | 0.080 | 0.050 | 0.040 |
| GR-outer | 250 | Avg. ΔdB | 0.015 | 0.029 | 0.028 | 0.023 | 0.028 |
| | | max ΔdB | 0.050 | 0.060 | 0.050 | 0.040 | 0.050 |
| BR-Inner | 250 | Avg. ΔdB | 0.010 | 0.020 | 0.028 | 0.027 | 0.021 |
| | | max ΔdB | 0.030 | 0.030 | 0.050 | 0.050 | 0.040 |
| BR-outer | 250 | Avg. ΔdB | 0.014 | 0.030 | 0.021 | 0.014 | 0.020 |
| | | max ΔdB | 0.030 | 0.050 | 0.040 | 0.030 | 0.040 |

LOW TEMPERATURE DRY LOOSE TUBE FIBER OPTIC CABLE

BACKGROUND OF THE INVENTION

1. Field of the Invention

This invention pertains to fiber optic cable constructions, and particularly to a dry, water blocking loose tube cable suitable for use at low temperatures.

2. Discussion of the Known Art

The infiltration of water inside a fiber optic cable can degrade the performance of the cable significantly, especially in environments where temperatures are at or below freezing. Passage of water internally over the length of the cable may also have adverse effects on cable end connectors and/or associated terminal equipment.

In the presence of moisture, glass fibers contained inside a fiber optic cable will tend to fracture even when stressed below their theoretical maximum tensile limit, due to surface flaws whose effects are aggravated by the moisture. Long lengths of glass fibers in the cable may therefore break after undergoing a strain of only about 0.5 percent elongation.

In view of the above, fiber optic cables have been constructed in ways that reduce or block the passage of water inside the cable, and minimize any stress transferred to internal fibers during cable installation and use. See, e.g., U.S. Pat. No. 4,909,592 (Mar. 20, 1990) and U.S. Pat. No. 5,630,003 (May 13, 1997), which are incorporated by reference. Both patents disclose cable arrangements in which tapes or yarns containing or coated with a super absorbent composition, are disposed in proximity to optical fibers inside the cable. The tape or yarn swells upon contact with water, and, thus, physically reduces or blocks continued passage of the water interiorly of the cable. Other water blocking means include the use of petroleum based or jelly-like filling materials, sometimes called "filling" compounds. These materials must be removed with a cleaning agent or solvent when a cable is opened at one end to carry out a splicing operation, however. The use of such solvents has a drawback in that color dyes or other indicia provided on the individual fibers for identification may also be removed. Accordingly, an all dry, water blocking cable configuration that allows splicing without requiring special cleaning agents to dissolve greasy filling compounds inside the cable, is most desirable.

The mentioned U.S. Pat. No. 5,630,003 is directed to a so-called loose tube fiber optic cable, wherein one or more flexible buffer tubes inside the cable each contain a set of optical fibers that extend through a passage of each tube. In a loose tube fiber optic cable, a strong but flexible central rod acts to resist tensile loads applied to the cable, i.e., the rod acts as a strength member. At the same time, the rod serves as an organizer about which the individual fiber-containing buffer tubes are helically wound. The rod is formed typically of, e.g., glass reinforced polyester (GRP) and is sheathed with a layer of polyethylene (PE). The use of glass for the central rod prevents the cable from behaving as an electrical conductor, and, therefore, minimizes the susceptibility of the cable to lightening or other unintentional contact with a potentially damaging electrical source.

In the cable of the '003 U.S. patent, a number of strands or filaments of an absorbent fiber yarn are disposed in the passage of each buffer tube. Also, dry strips impregnated with a water absorbent composition (e.g., DryBlock® available from OFS Fitel USA) are arranged to fill voids that would otherwise form inside the cable, outside of the buffer tube walls. A cable similar to that disclosed in the '003 U.S. patent is available from OFS under the trademark "Fortex DT".

The dry loose tube fiber optic cable configuration described above requires that a water absorbent member (e.g., a coated yarn) be disposed in the passage of each buffer tube during cable production. Therefore, the member must not only be physically compatible with the buffer tube, but should not affect the transmission characteristics of the optical fibers inside the tube significantly either before or after the member swells to block water movement through the tube passage.

Dry, water absorbent materials used in fiber optic cables are typically particulate in nature. If such particles are coated on a yarn, and the coated yarn is then placed in the passage of a buffer tube, the particles will likely come into direct contact with the fibers in the same passage. It has been found that such contact induces macrobending loses at very low temperatures, resulting in unacceptable increases in fiber attenuation.

Fiber optic cables are manufactured to meet various industry standards one of which is Telcordia® GR 20, Issue 2 (1998)("the Telcordia standard"). This standard, which is incorporated by reference, requires a cable to maintain prescribed performance parameters over a temperature range of from −40 to +70 degrees C. As far as is known, a dry, loose tube fiber optic cable that can maintain the prescribed parameters with respect to water penetration, fiber attenuation, and tensile strength, when cycled to a temperature as low as −60 degrees C., has not been commercially produced. Nevertheless, there is a significant market for such a cable in regions where fiber optic cables are deployed at temperatures as low as −60 degrees C.

SUMMARY OF THE INVENTION

According to the invention, a water blocking configuration for use in a low temperature, dry loose tube fiber optic cable includes one or more flexible buffer tubes each having a passage sized to contain one or more optical fibers, and a length of yarn disposed in the passage of each of the buffer tubes. The yarn has a denier of not more than about 1500 and is coated with particles of a water absorbent material. The particles of the material have a size distribution of between zero and not more than about 160 microns.

According to another aspect of the invention, a low temperature dry loose tube fiber optic cable has an outer jacket, a central rod member, and one or more flexible buffer tubes arrayed between the outer jacket and the rod member. Each buffer tube has a passage sized to contain one or more optical fibers, and a length of yarn is disposed in the passage of each buffer tube. The yarn has a denier of not more than about 1500 and is coated with particles of a water absorbent material. The particles of the material have a size distribution of between zero and not more than about 160 microns.

For a better understanding of the invention, reference is made to the following description taken in conjunction with the accompanying drawing and the appended claims.

DETAILED DESCRIPTION OF THE INVENTION

Figure 1:
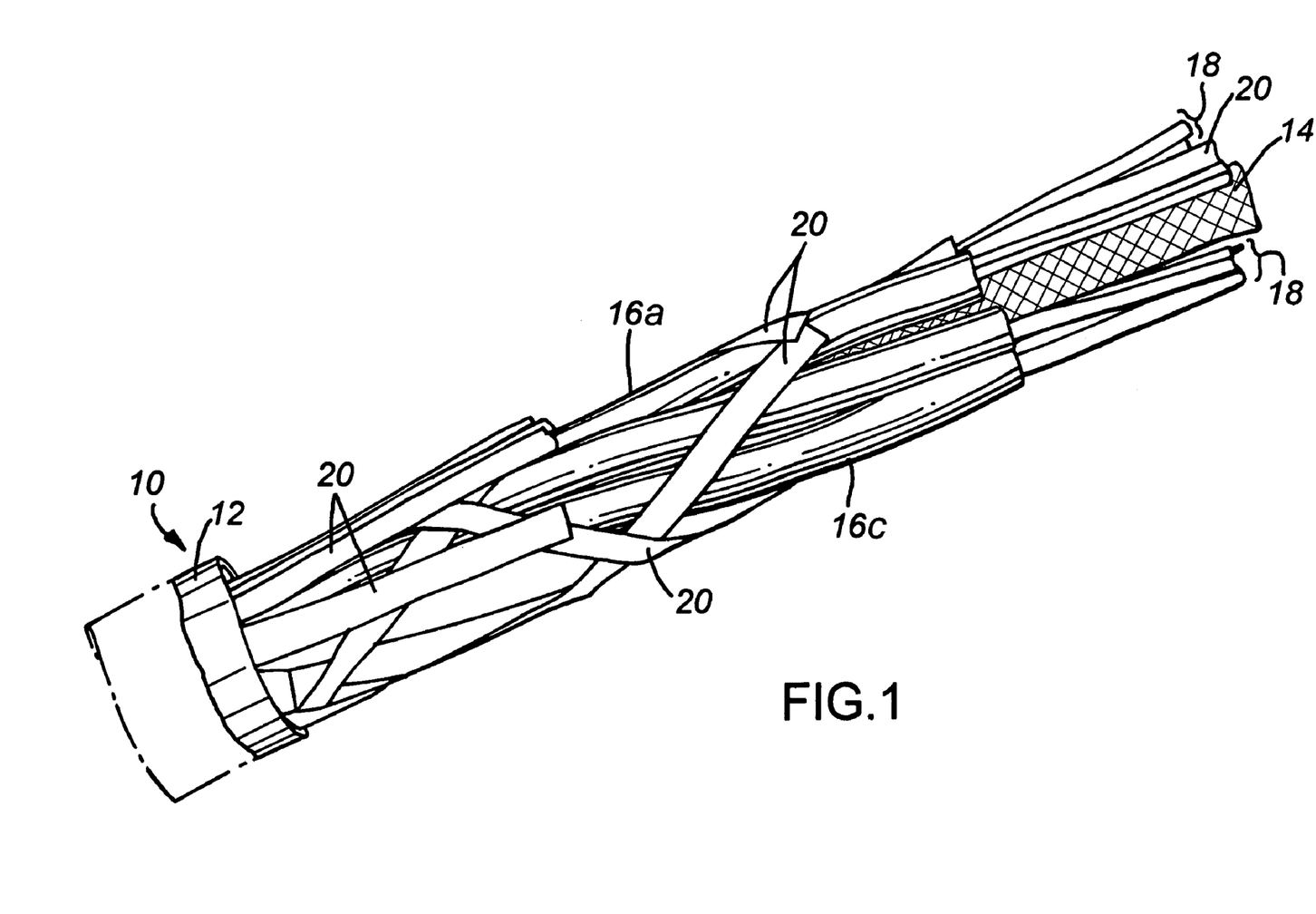
FIG. 1 is a perspective view of one end of a loose tube fiber optic cable.
Figure 2:
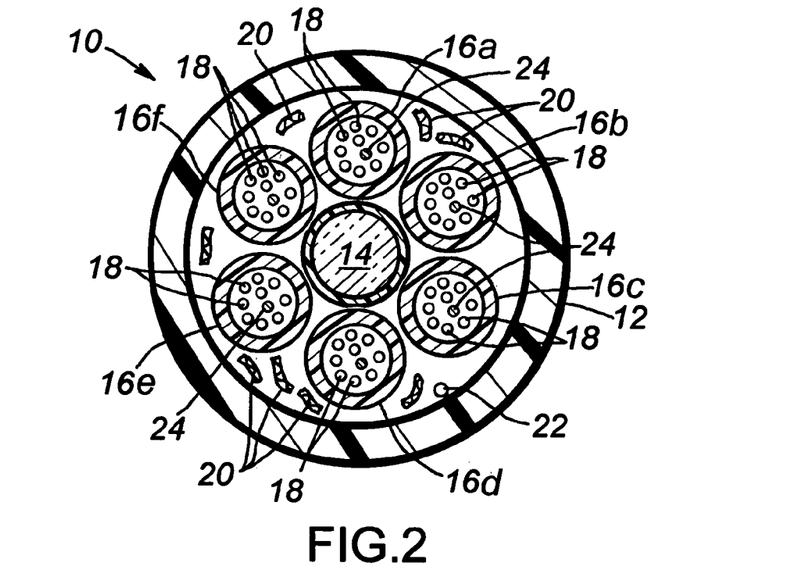
FIG. 2 is an enlarged view of a cross section through the cable of FIG. 1, showing a number of buffer tubes disposed about a central rod member.

FIG. 1 is a perspective view of one end of a loose tube fiber optic cable 10. FIG. 2 is an enlarged cross section taken transversely of a length of the cable 10 in FIG. 1. As shown in the drawing, the cable 10 has an outer jacket 12 formed of, for example, medium or high density polyethylene, polypropylene, EVA or PVC. A central rod member 14 runs substantially coincident with the long axis of the cable 10, and the member 14 absorbs such tensile forces as may be encountered by the cable during installation and use. As mentioned earlier, the rod member 14 may be formed of a glass epoxy material sufficiently flexible to allow the cable 10 to bend as required during installation, and to conform with a desired cable run path. The rod member 14 is typically sheathed or upjacketed with a layer of polyethylene, polypropylene, EVA, PVC or other polymer in a known manner. The rod member 14 may also be formed of steel.

A number of buffer tubes, for example, six buffer tubes 16a to 16f are disposed in a circular layer about the rod member 14, between the inner periphery of the cable jacket 12 and the rod member. See FIG. 2. Each of the tubes 16a–16f is formed preferably of a flexible strong material that is able to withstand compression. One suitable material is a polyolefin such as polypropylene or HDPE. Preferred dimensions of the buffer tubes are, without limitation, an outer diameter (OD) of about 2.5 mm (0.098 inch), and an inner diameter (ID) of about 1.7 mm (0.067 inch).

Each one of the buffer tubes contains a set of one or more optical transmission fibers 18. In the embodiment represented in FIG. 2, each buffer tube contains six fibers in its passage. As few as one and as many as 12 fibers may be contained in the passage of any one tube, however. In order to identify a given fiber 18 among the total fiber count of the cable 10, each tube may be dyed a different color or have other distinguishing indicia with respect to the remaining tubes. Also, to identify a given fiber among the set of fibers in each tube, each fiber may also have a different color dye or other means to distinguish it from others of the same set.

Figure 3:
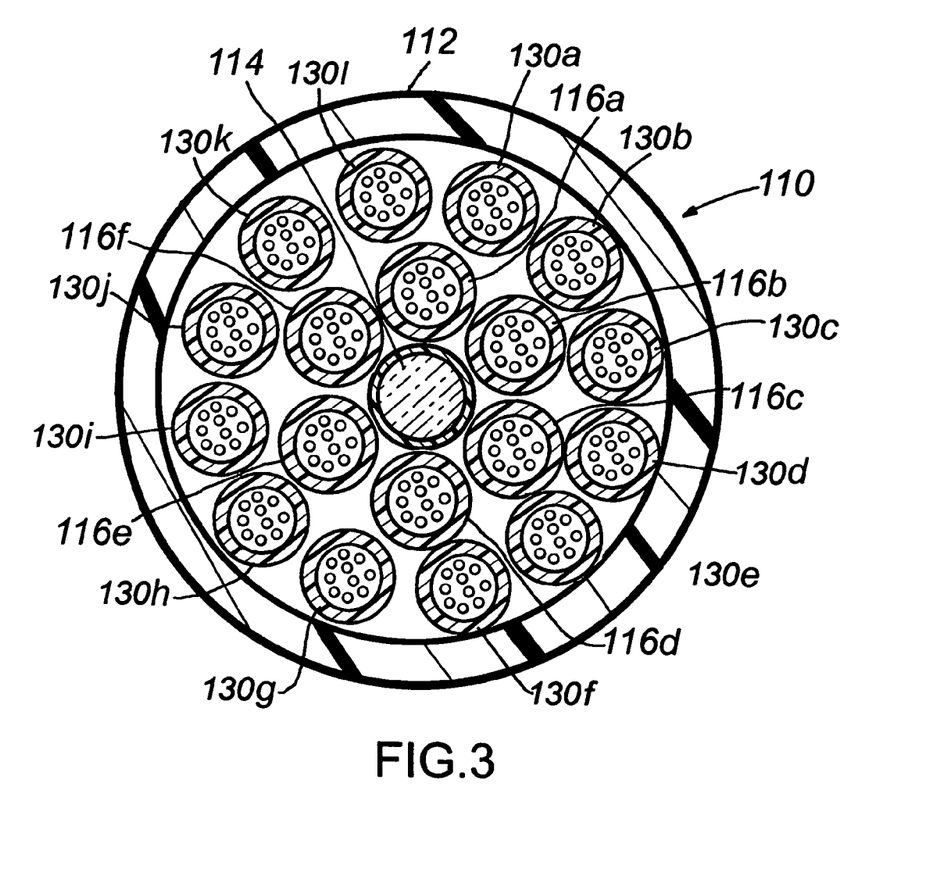
FIG. 3 is a cross-sectional view of a loose tube fiber optic cable having two circular layers of buffer tubes concentric with a central rod member.

In the embodiment of FIG. 2, the cable 10 has the six buffer tubes 16a to 16f organized symmetrically in one circular layer about the central rod member 14. If necessary to obtain a higher fiber count for the cable, additional buffer tubes may be provided and arranged in the same layer, or in a second circular layer over the first layer of tubes as shown in FIG. 3. Further, one or more of the buffer tubes can be substituted with "dummy" tubes known as filler rods so as to maintain a desired cable geometry. That is, the filler rods are used when the total fiber count for the cable is routed through less than the number of buffer tube positions needed to establish the desired cable geometry.

FIG. 3 depicts an 18-buffer tube configuration, including six buffer tubes 116a to 116f in a first layer, and 12 buffer tubes 130a to 130l in a second layer arrayed about the first layer and substantially concentric with an axial rod member 114. In FIG. 3, cable components the same or similar to those in FIGS. 1 and 2 are identified by the same reference numbers increased by 100.

In FIG. 2, flexible strips 20 of a dry, water absorbent material such as, e.g., DryBlock® water blocking material available from OFS Fitel USA, are deposited around the buffer tubes 16a–16f to fill voids or interstices between the central rod member 14 and the inner circumference of the jacket 12. A rip cord 22 also extends near the inside surface of the jacket 12 to facilitate removal of the jacket at a free end of the cable, and to expose the buffer tubes as in FIG. 1. If necessary, the cable 10 can be armored by adding, e.g., a corrugated steel armored tube adjacent the inner circumference of the jacket 12, and, if desired, an inner jacket of, e.g., polyethylene between the armored tube and the buffer tubes inside the cable.

A thread or yarn 24 also extends through the passage in each one of the buffer tubes 16a–16f. Preferably, not more than one cross section of the yarn 24 is present at any given cross section of each buffer tube along the length of the cable 10. That is, while a given buffer tube may have short segments in which the yarn 24 is absent (e.g., a break in the yarn), it is preferred that not more than one yarn 24 be present in a given profile of the passage in each buffer tube.

It has been discovered that by limiting the denier of the yarn 24 to not more than approximately 1500, and then coating the yarn with a water absorbent material in the nature of particles whose size distribution is in a range between zero and approximately 160 microns, the cable 10 will meet the Telcordia standard when cycled to a low temperature of −60 degrees C. with respect to water penetration, fiber attenuation, and tensile strength. Particle size may be measured, e.g., with the aid of a scanning electron microscope (SEM) in a manner known in the art.

Suitable water absorbent materials include, e.g., polymers comprising a chain of acrylic acids that are partially substituted with Na and are lightly crosslinked with one another to form a three dimensional network. As mentioned, the particles of water absorbent material used in the present invention have a size distribution ranging between zero and 160 microns. In addition, the average particle size is preferably about 60 microns, wherein 98 percent of the particles do not exceed 106 microns in size, and only 2 percent of the particles are between 106 and 160 microns in size. The diameter of the coated yarn, whether 250 or 1500 denier, preferably does not exceed about 0.015 inches. The yarn 24 may also be disposed so as to serve as a rip cord for opening an end of an associated buffer tube, and thus permit access to the contained fibers.

A low shrink polyester yarn having a denier (uncoated) of 250 and which was used in the Example below, is available with a suitable water absorbent coating from Fiber-Line Inc., of Hatfield, Pa., under the designation FL-P250LS/Swellcoat®-3. By definition, a yarn with a denier of "x" weighs "x" grams per 9,000 meters length.

Figure 4:
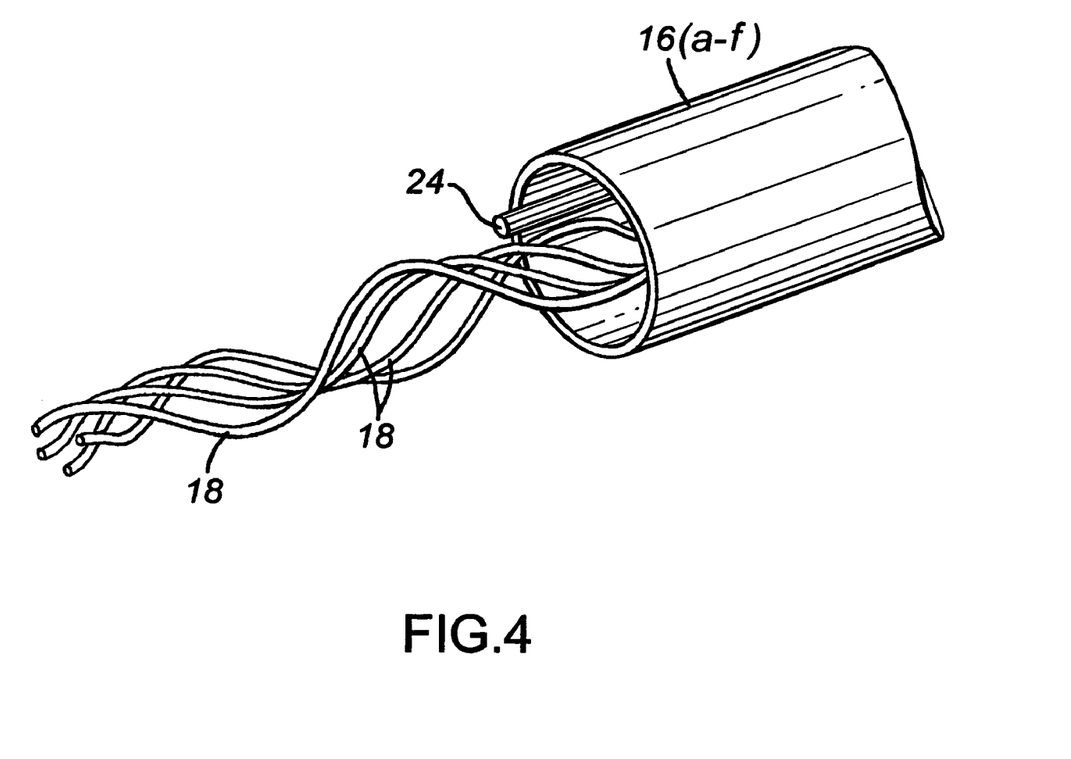
FIG. 4 is a perspective view of one end of a buffer tube, showing a number of optical fibers and a water absorbent coated yarn routed inside the tube.

FIG. 4 shows an open end of one buffer tube in the cable of either FIG. 1 or FIG. 3, including the optical fibers 18 and the one yarn 24 inside the tube. As known in the art, excess lengths of the fibers 18 (excess fiber lengths, or EFL) are provided inside the buffer tube passages to ensure that the fibers will not fracture or break when tension is transferred to the tube wall during cable handling and installation. The buffer tubes with the contained fibers are helically wound about the central rod member 14, usually in a reverse oscillating lay (ROL) pattern. That is, the tubes are wound about the member 14 with a determined pitch, and the winding direction (CW or CCW) is reversed at determined intervals along the length of the rod member. Without the excess fiber lengths depicted in FIG. 4, the fibers 18 may become overstressed inside the buffer tubes when the tubes are wound about the rod member 14.

EXAMPLE

Figure 5:
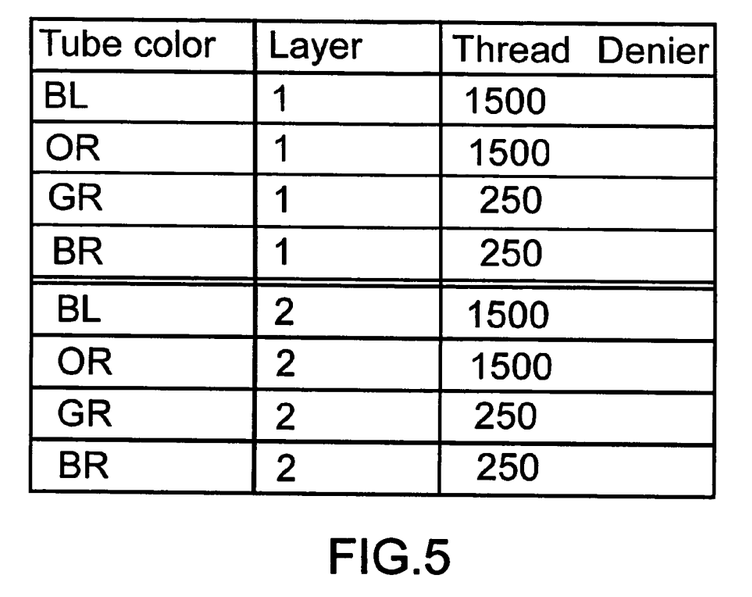
FIG. 5 is a table associating certain ones of the buffer tubes in the cable of FIG. 3 with a water absorbent coated yarn in each tube.

Tests were performed on three samples of a dry loose tube cable constructed with the two-layer tube configuration of FIG. 3. The table in FIG. 5 identifies four test buffer tubes in each of the two layers, for a total of eight active tubes in each sample cable. Filler rods were used at two tube positions in the first layer, and at eight tube positions in the second layer. The test buffer tubes in each layer are identified by color, viz., BL (blue), OR (orange), GR (green), and BR (brown). In each layer, the tubes BL and OR each contained a single yarn of 1500 denier that was coated with a water absorbent material as described above. Each of the tubes GR and BR was provided with a single yarn of 250 denier, and the yarn was coated with the above-described water absorbent material. In addition to the coated yarn, each tube contained 12 optical fibers. Tube dimensions were ID=1.7 mm, and OD=2.5 mm.

The performance of each sample cable was evaluated using the Telcordia standard criteria for (a) water penetration at one meter depth over a 24-hour period, (b) changes in fiber attenuation, and (c) fiber strain in response to 600 pounds cable tension. Test chamber temperature was cycled down to −60 degrees C., however, rather than to −40 degrees C. as prescribed by the Telcordia standard.

Figure 6:
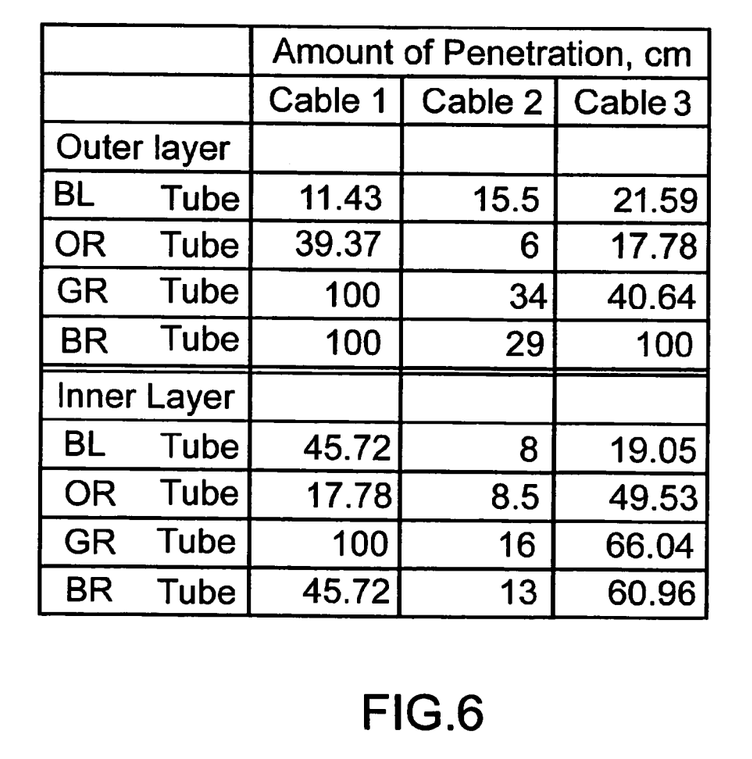
FIG. 6 is a table showing results of a water penetration test on three samples of fiber optic cable constructed according to the invention.

FIG. 6 shows the results of the 24-hour water penetration test for the three sample cables. Numerical entries for each sample represent measured water penetration, in centimeters, through the corresponding buffer tubes of each layer. As seen in FIG. 6, buffer tubes BL and OR in each layer, i.e., those tubes containing the coated 1500 denier yarn, blocked passage of water fully at points less than half way (50 cm) along the length of the sample cable under test. Note the maximum penetration of 49.53 cm in buffer tube OR of the first (inner) layer in sample cable 3.

Buffer tubes GR and BR were provided with the coated 250 denier yarn, and in some cases showed water penetration over the entire length (100 cm) of the tube. In any event, no dripping of water was observed at a downstream end of any of the sample cables under test after 24 hours, thus passing the applicable Telcordia standard.

Figure 7:
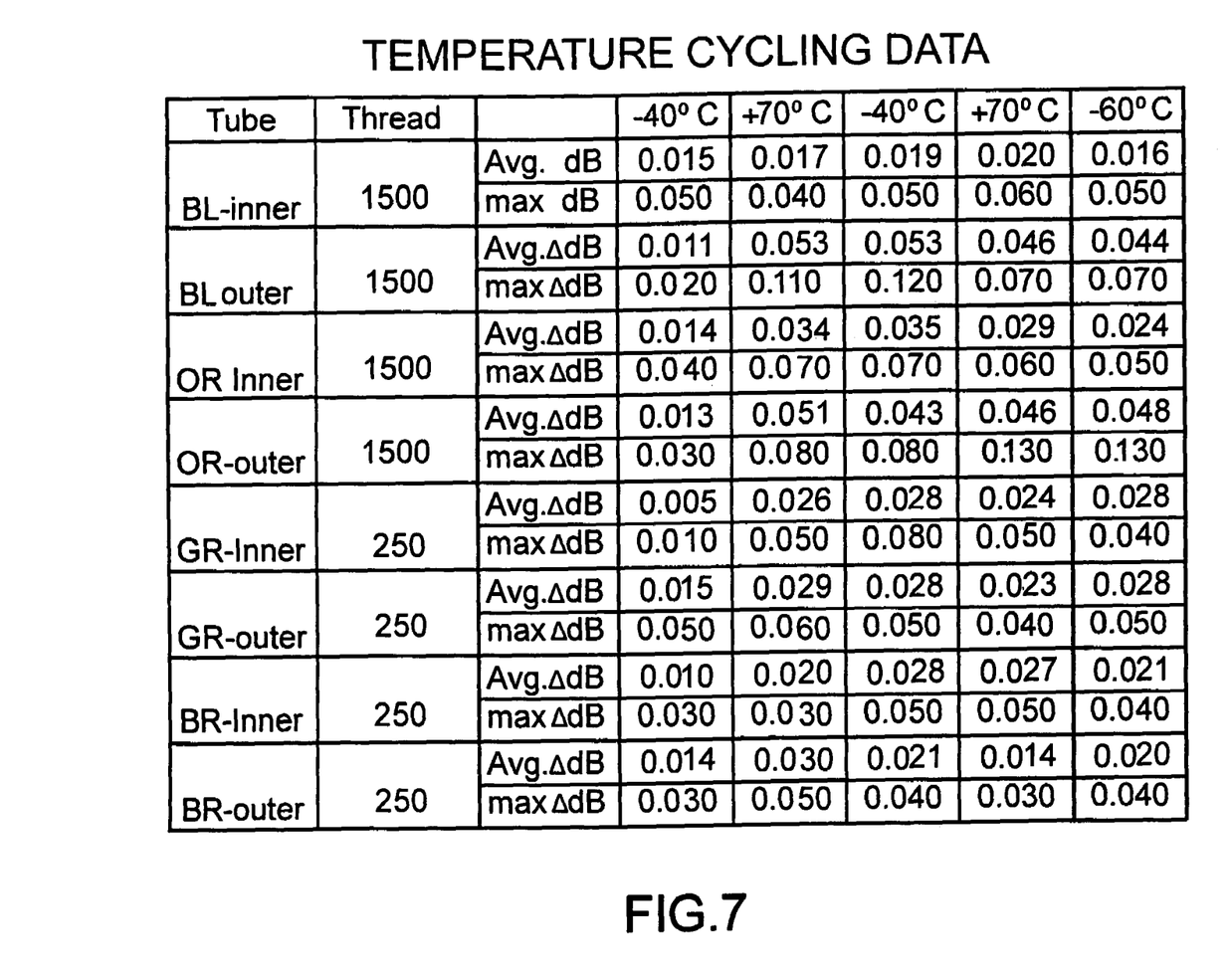
FIG. 7 is a table showing measured variations in fiber attenuation when a sample cable according to the invention was cycled between temperatures ranging from +70 to −60 degrees C.

FIG. 7 shows the results of a temperature cycling test performed on one kilometer of a sample cable having the same buffer tube configuration as the sample cables described above. The cable was placed in a chamber at a temperature of 23 degrees C., and the attenuation (in dB) through each of the 12 fibers in each active tube was measured as a reference. The chamber temperature was then lowered to −40 degrees C., and the attenuation through each fiber was measured again. The average change in attenuation (Avg. ΔdB) and the maximum change in attenuation (Max. ΔdB) were calculated for the 12 fibers in each buffer tube, and are shown in the first temperature column in the table of FIG. 7. Further Avg. ΔdB and Max. ΔdB calculations were made at chamber temperatures of +70, −40, +70, and −60 degrees C. See the corresponding columns in the table of FIG. 7. The Telcordia standard sets the Avg. ΔdB at not more than 0.05, and the Max. ΔdB for ten percent of the fibers in each tube at 0.15. FIG. 7 shows that the Max. ΔdB for all of the fibers was less than 0.15, and that the Avg. ΔdB was in most all instances less than 0.05.

Figure 8:
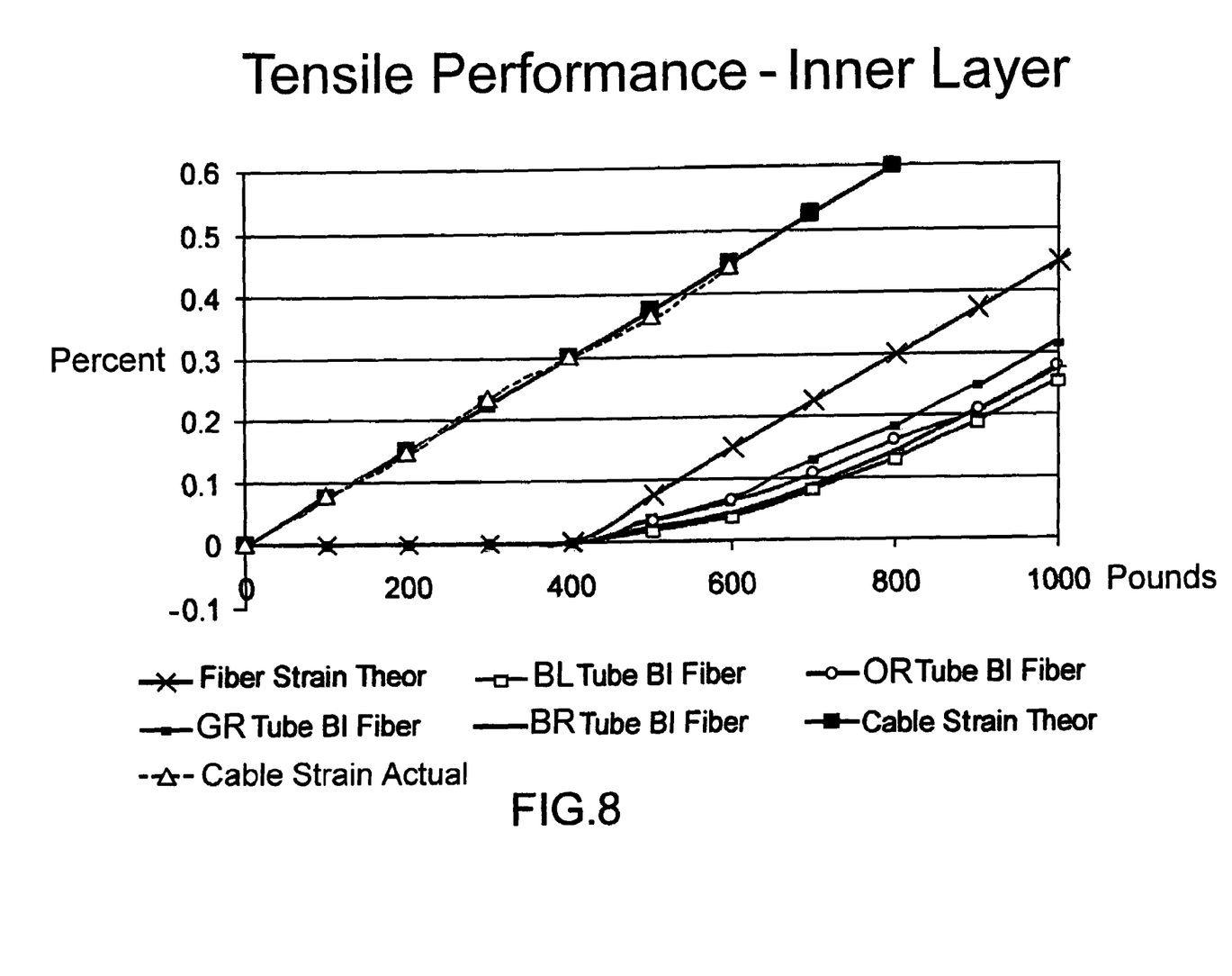
FIG. 8 is a graph showing tensile performance of fibers in an inner layer of buffer tubes in the cable of FIG. 3.
Figure 9:
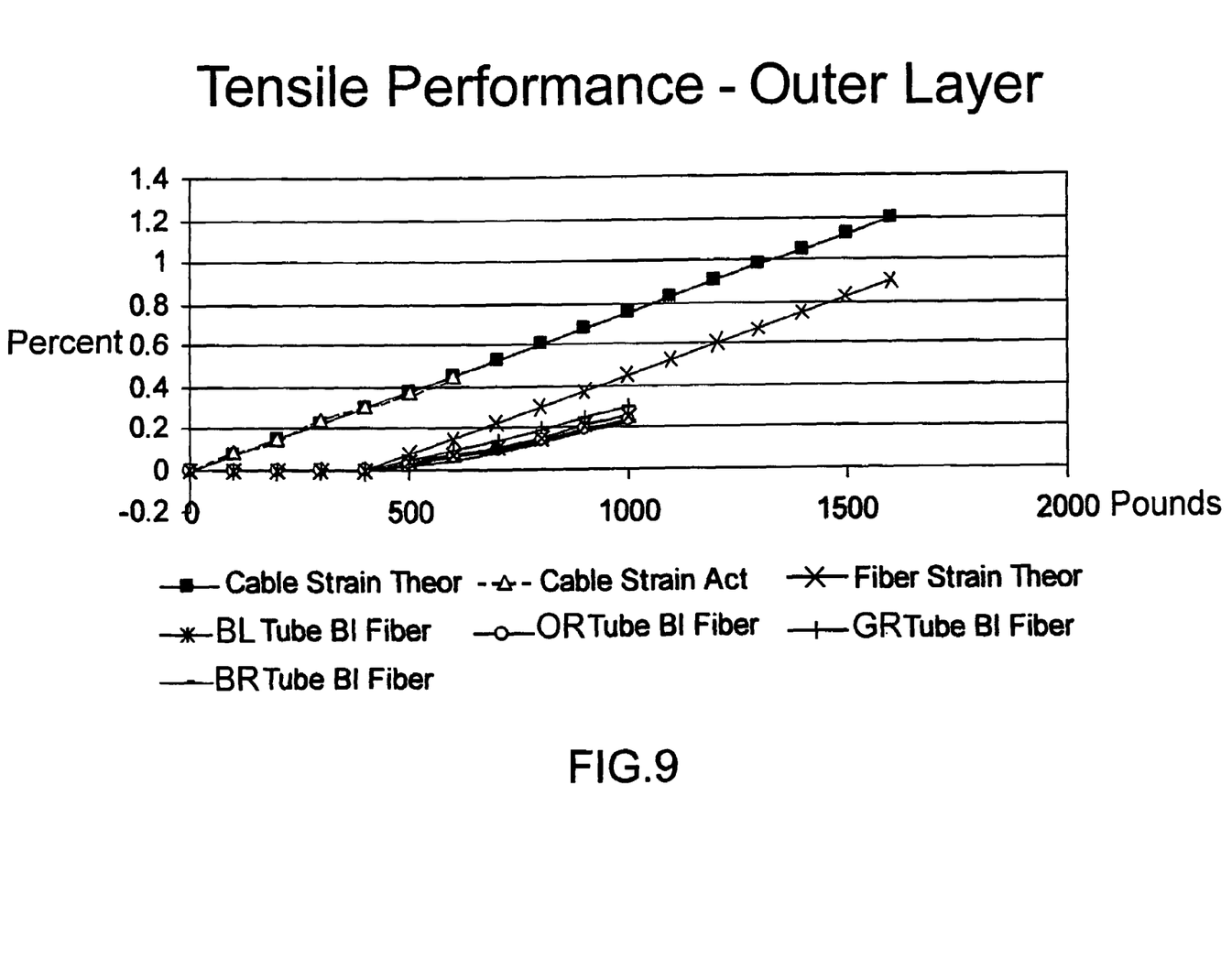
FIG. 9 is a graph showing tensile performance of fibers in an outer layer of buffer tubes in the cable of FIG. 3.

FIG. 8 shows tensile performance of a selected optical fiber (BI) in each active buffer tube of the first (inner) layer of tubes in the sample cable. FIG. 9 is a graph showing tensile performance of a selected optical fiber (BI) in each active buffer tube in the second (outer) layer of tubes in the sample cable. The Telcordia standard limits individual fiber strain to not more than 60% of its proof strain at the recommended installation load (which is 600 pounds for the cable under test). The plotted results shown in FIGS. 8 and 9 demonstrate that the inventive dry loose tube cable configuration meets the standard with respect to fiber strain.

While the foregoing represents preferred embodiments of the invention, it will be understood by those skilled in the art that various modifications and changes may be made without departing from the spirit and scope of the invention, and that the invention includes all such modifications and changes as come within the scope of the following appended claims.

We claim:

1. A water blocking configuration for use in a low temperature, dry loose tube fiber optic cable, comprising:
   one or more flexible buffer tubes each having a passage dimensioned for containing one or more optical fibers; and
   a length of yarn disposed in the passage of each of the buffer tubes;
   wherein the yarn has a denier of not more than about 1500 and is coated with particles of a water absorbent material having a size distribution of between zero and not more than about 160 microns.

2. The water blocking configuration of claim 1, wherein the particles of water absorbent material have an average size of about 60 microns.

3. The water blocking configuration of claim 1, wherein about 98 percent of the particles of water absorbent material do not exceed 106 microns in size, and about 2 percent of the particles are between 106 and 160 microns in size.

4. The water blocking configuration of claim 1, wherein not more than one coated yarn is present in a given profile of the passage of each buffer tube.

5. The water blocking configuration of claim 1, wherein the yarn has a denier of about 250.

6. The water blocking configuration of claim 1, wherein the coated yarn has a diameter of not more than about 0.015 inches.

7. The water blocking configuration of claim 1, wherein the buffer tubes have inner diameters of about 1.7 mm.

8. The water blocking configuration of claim 1, wherein the water absorbent material is a polymer comprising a chain of acrylic acids that are partially substituted with Na and are lightly crosslinked with one another to form a three dimensional network.

9. The water blocking configuration of claim 1, wherein the yarn is disposed to operate as a rip cord for opening an associated buffer tube.

10. A low temperature dry loose tube fiber optic cable configuration, comprising:

an outer jacket;

a central rod member;

one or more flexible buffer tubes arrayed between the outer jacket and the rod member, and each buffer tube has a passage sized to contain one or more optical fibers;

a length of yarn disposed in the passage of each buffer tube, wherein the yarn has a denier of not more than about 1500 and is coated with particles of a water absorbent material; and the particles of the water absorbent material have a size distribution of between zero and not more than about 160 microns.

11. A cable configuration according to claim 10, wherein the particles of water absorbent material coated on the yarn have an average size of about 60 microns.

12. A cable configuration according to claim 10, wherein about 98 percent of the particles of water absorbent material do not exceed 106 microns in size, and about 2 percent of the particles are between 106 and 160 microns in size.

13. A cable configuration according to claim 10, wherein not more than one coated yarn is present in a given profile of the passage of each buffer tube.

14. A cable configuration according to claim 10, wherein the yarn has a denier of about 250.

15. A cable configuration according to claim 10, wherein the coated yarn has a diameter of not more than about 0.015 inches.

16. A cable configuration according to claim 10, wherein the buffer tubes have inner diameters of about 1.7 mm.

17. The cable configuration of claim 10, wherein the water absorbent material is a polymer comprising a chain of acrylic acids that are partially substituted with Na and are lightly crosslinked with one another to form a three dimensional network.

18. The cable configuration of claim 10, wherein the yarn is disposed to operate as a rip cord for opening an associated buffer tube.

* * * * *